United States Patent [19]

Bruneau

[11] 4,251,008
[45] Feb. 17, 1981

[54] COUNTING APPARATUS

[75] Inventor: Lawrence W. Bruneau, Stow, Mass.

[73] Assignee: Vibra-Feed Inc., Weston, Mass.

[21] Appl. No.: 923,063

[22] Filed: Jul. 10, 1978

[51] Int. Cl.³ .............................................. B65G 59/06
[52] U.S. Cl. ...................................... 221/7; 221/298;
221/241; 250/222 R; 193/44
[58] Field of Search ............. 235/92 PD; 250/222 R,
250/222 PC; 198/503, 391, 530, 532, 298, 289,
7; 209/911, 574, 551; 221/7, 289, 298, 241;
193/38, 44, 25 FT; 324/158 R, 158 D, 158 T

[56] References Cited

U.S. PATENT DOCUMENTS

| 2,975,878 | 3/1961 | Cason | 324/158 D |
| 3,304,499 | 2/1967 | Vincze | 221/298 X |
| 3,399,756 | 9/1968 | Klapes | 198/503 X |
| 3,743,091 | 7/1973 | Foulkes | 209/911 X |

Primary Examiner—Allen N. Knowles
Attorney, Agent, or Firm—Maurice R. Boiteau

[57] ABSTRACT

There is disclosed in the present application apparatus for separating articles or workpieces such as axially leaded electronic components, from a group of jumbled similar articles, arranging the articles in order in a reservoir in the form of a vertical guideway in which all are similarly oriented and discharging the articles from the reservoir one at a time in a controlled manner so as to obtain a count either of a predetermined number or of a total in a given lot.

11 Claims, 7 Drawing Figures

COUNTING APPARATUS

The present invention relates generally to improvements in apparatus for separating articles or workpieces into predetermined quantities or batches and also for counting quantities of similar articles in a lot. According to one aspect, the present invention relates more particularly to apparatus either for batching, counting out predetermined numbers, or counting random lots of axially leaded parts such as resistors, transistors and other electronic components of generally similar size and characteristic shape.

In the electronics industry, parts such as resistors, transistors and diodes must frequently be counted with reliable accuracy. Instances requiring either counting or batching include the preparation of orders to be shipped by component manufacturers to their customers and the verification by customers of large quantities of similar components received from vendors. In addition, inventory control and batching for the production of specific lots of product assemblies require accurate counting of components in the plants of electronic manufacturers. Because of the difficulties heretofore encountered in counting leaded components accurately by machine, such counting has been performed largely manually at relatively low speeds and at substantial cost.

Another problem which has also discouraged attempts to automate the batching and counting of axially leaded electronic components is the great variety of sizes and shapes which must all be handled accurately in order for the counters to be effective. Accordingly, the cost of providing specialized counting apparatus suitable for a component of a single size and shape has been economically feasible only when the component is produced and used in very large quantities of a single size and shape.

It is accordingly an object of the present invention to provide apparatus for counting and batching articles such as axially leaded electronic components reliably, economically and at far higher speeds than is possible manually.

Another object is to accomplish the batching and counting of articles within a relatively broad range of sizes and shapes without requiring time consuming and expensive replacement of apparatus parts and complicated adjustments each time there is a change in the size and/or shape of the articles being processed.

Still another object is to avoid false counting by mistaking either two articles or no article as one.

A still further object is to accomplish the counting of articles in versatile apparatus which may be economically produced and maintained and which will operate reliably at high speed for extended periods of time without requiring adjustments or maintenance.

In the achievement of the foregoing objects, a feature of the invention resides in the gating of a vertical guideway which serves as a temporary intermediate reservoir, so that parts are discharged one at a time from the guideway under precise control to be "seen" by a photo cell. Upon seeing a single part dropping away from an escapement which gates the guideway, the photo cell generates an electrical pulse which operates an electromechanical counter. The escapement is so constructed that as the lowermost article in the guideway is being released to fall past the photo cell, the article immediately above it is positively retained in the guideway so as to avoid the possibility of having two articles counted as one.

According to a feature particularly related to the batching or counting of axially leaded electronic components, the escapement is adjustable to accommodate a relatively broad range of component body lengths and lead diameters without risking damage to the components being counted. In addition, the vertical guideway which acts as the intermediate parts reservoir immediately above the escapement is also adjustable within a comparably broad range so that each component, regardless of size within the range, is accurately restrained and its passage from the guideway is accomplished without damaging the article. For this purpose, the escapement, which includes a pair of two part arcuate members spaced apart in the direction of the length of the article being operated upon, is fully adjustable in spacing to accommodate different body lengths of articles and the two parts of each member are also adjustable in their end to end spacing to provide between them a slot of variable width to suit lead wires of different diameters.

The foregoing objects and features will be more fully understood from the following detailed description of an illustrative embodiment of the invention taken in connection with the accompanying drawings in which.

Figure 1:
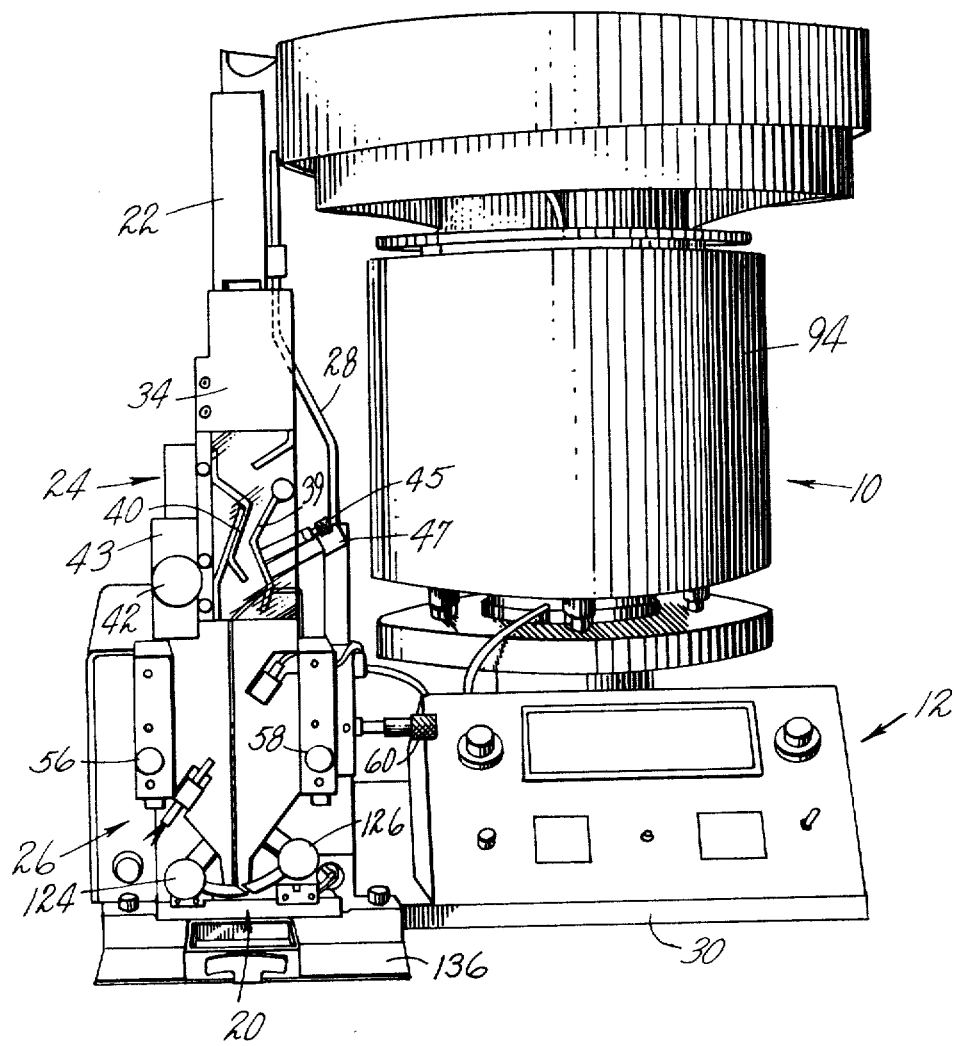
FIG. 1 is a view in front elevation of a batching and counting apparatus according to the present invention.
Figure 2:
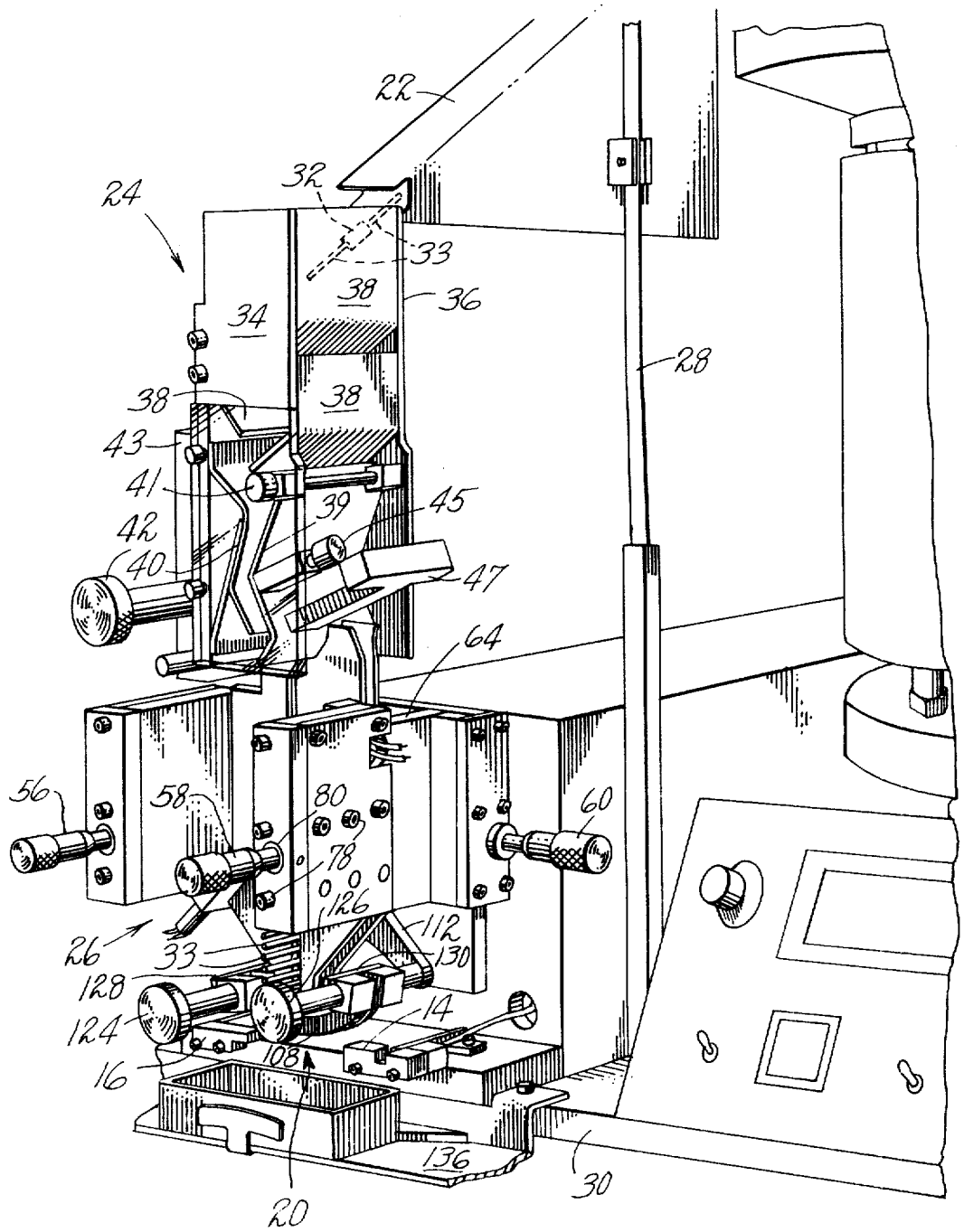
FIG. 2 is a view in perspective as seen from the right front of the machine depicted in FIG. 1.

Turning now to the drawings, particularly FIGS. 1 and 2, there is shown an apparatus according to the present invention including a vibratory bowl feeder indicated generally at 10 and an electromechanical counter indicated generally at 12. The bowl feeder 10 and the counter 12 are commercially available units which relate to the present invention only to the extent that they cooperate with the novel elements which control the movement of articles after they leave the feeder 10 until they are "seen" by a photo cell assembly shown in FIG. 3 and including a photo cell 14 and a light source 16 which directs a beam of light through the path of articles to be counted and to the cell 14. The segregation of articles or work pieces, their alignment, control and release are accomplished according to the present invention but the counter 12 merely operates to count one article each time one drops through and temporarily partially interrupts the light beam reaching the photo cell 14, which is thereby partially darkened causing an electrical pulse to actuate the counter.

For performing the functions of separating workpieces from a group of intermingled similar workpieces, orienting them in a uniform direction, temporarily storing them in an aligned stack and dispensing them one at a time, there are included elements which define a path for the workpiece from the bowl feeder to an escapement assembly indicated generally at 20, which discharges one workpiece at a time to be seen by the photo cell 14 and recorded by the counter 12. Interposed between the feeder 10 and the escapement 20 is a covered inclined ramp 22 which guides workpieces from the feeder to the top of a vertical cascade assembly indicated generally at 24 to be centralized and oriented in a generally horizontal direction for entry into a vertical guideway which stores a quantity of workpieces in an aligned stack to be fed by gravity to the escapement assembly 20.

The inclined ramp 22 is supported on a vertical standard 28, upstanding from a base plate 30 upon which the apparatus is supported. The ramp 22 guides workpieces such as axially leaded electronic components having a body 32 and axially extending lead wires 33, as best shown in FIG. 2, from the output of the feeder 10 to the top of the cascade assembly 24. The parts of the cascade assembly are relatively fixed and passive and include front and rear wall members 34 and 36 respectively and a plurality of upper guide plates 38 joined to the front and rear walls. Each guide plate 38 includes a vertical portion which partially closes the side of the assembly and an inclined guide surface which together cause the components to reverse their direction from side to side several times during their descent through the cascade assembly. Immediately below the plates 38 is a pair of zigzag plates 39 and 40 defining between them a progressively narrowing pathway for the workpieces 32, 33 which are thereby given a generally horizontal orientation for entry into the vertical guideway assembly 26. As best seen in FIG. 2, the plate 40 is fixed but the plate 39 is pivoted at 41 and adjustable toward and away from the plate 40 to suit the diameter of the workpiece body 32. The position of the plate 39 with respect to the plate 40 is controlled by an adjusting screw 45 which limits the approach of the plate 39 to the plate 40, usually to a spacing slightly greater than the diameter of the body 32 to prevent the simultaneous passage of two workpieces side by side. A counterweight 47 is secured to the plate 39 for causing its distal end to be urged toward the plate 40. In order to position the cascade assembly in a front to rear direction, it is mounted on a slide 43 which is movable by an adjusting screw 42, also seen in FIG. 4.

In the present apparatus, each cascade assembly 24 such as the one which has now been described is usable for a range of approximately ¼ inch in overall workpiece lengths, for reasons which will hereinafter appear. If the workpieces which are to be operated upon are either longer or shorter than the ¼ inch range, the whole assembly 24 is replaced by a similar one adapted to the different range of workpiece lengths. For this purpose, the whole assembly is designed to be readily removable from the slide 43 to which it is secured by a single thumbscrew 42. Each cascade assembly is thus mounted in alignment with the vertical guideway assembly 26. It will also be appreciated that the present cascade assembly does not include a provision for operating upon workpieces having lead wires of different lengths and it is generally assumed, as is usually the case, that the lead wires are of equal length within a tolerance of approximately ⅛ inch.

Figure 3:
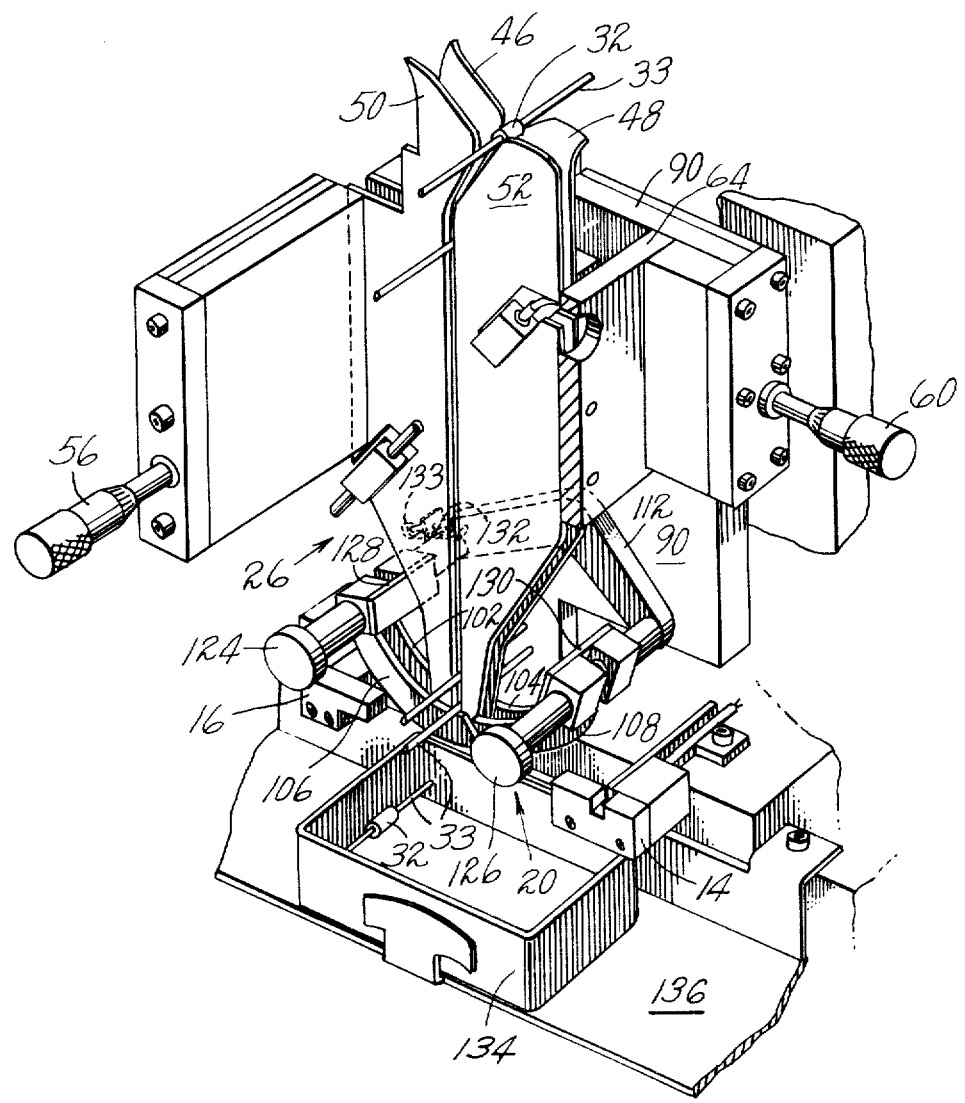
FIG. 3 is a fragmentary view in perspective as seen from the upper right, showing construction details of a vertical guideway and escapement forming a part of the apparatus depicted in FIGS. 1 and 2.

In order to render the present apparatus versatile in its ability to handle workpieces within a broad range of body diameters and lengths and lead wire diameters, the vertical guideway assembly 26 and the ascapement assembly 20 are quickly and accurately adjustable to adapt to different workpiece dimensions. For this purpose, the assembly 26 comprises left and right rear plates 46 and 48 respectively, which cooperate with left and right adjustable front plates 50 and 52 respectively. As best seen in FIG. 3, the tops of the plates 46, 48, 50 and 52 are flared outwardly and the top edges slope downwardly toward the inner edge in order to centralize workpieces which have been roughly oriented by passing through the cascade assembly 24. In order to adapt to different lengths of component bodies 32, the distance between the rear plates 46 and 48 and the front plates 50 and 52 is precisely adjustable by means of micrometer heads 56 and 58 while the lateral spacing of the plates 48 and 52 from the plates 46 and 50 is accomplished by moving the plates 48 and 52 under the precise control of a third micrometer head 60.

The adjustment of the vertical guideway assembly 26 will best be understood by keeping in mind that the plate 46 is the only one which is fixed while the plates 48, 50 and 52 are mounted for adjustment with respect to the plate 46. Thus the plate 50 is mounted on a slide under the control of the micrometer head 56 so that the spacing between it and the plate 46 may be adjusted to suit the length of the body 32. Similarly, the plate 52 is mounted on a slide under the control of the micrometer head 58 so that its spacing from the plate 48 may be precisely adjusted. For controlling the distance between the inner edges of the plates to adapt to different diameters of lead wires 33, the plates 48 and 52 are movable toward and away from the plates 46 and 50, being mounted for this purpose on a slide under the control of the micrometer head 60.

Figure 5:
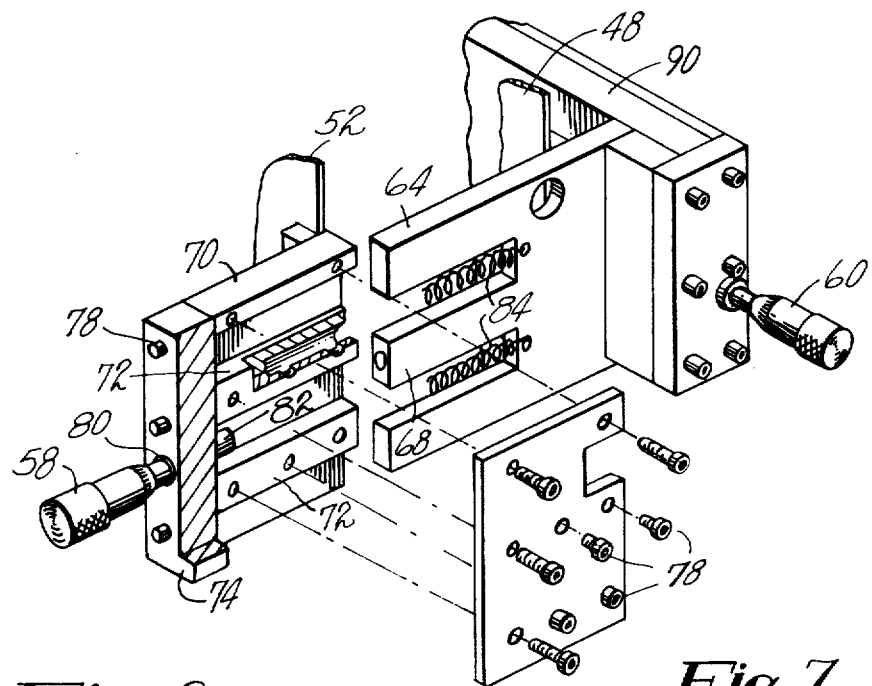
FIG. 5 is a detail view in perspective of an adjustment device for the vertical guideway with the parts shown in separated relationship for clarity.

The slides controlled by the micrometer heads 56, 58 and 60 are essentially alike in their design and for this reason only one that controlled by the head 58 and best seen in FIG. 5, will be described in detail. The mechanism for adjusting the distance of the plate 52 from the plate 48 includes a relatively fixed trifurcated track 64 formed with slots 66 which define a central finger 68. The track 64 fixedly supports the plate 48 and is in turn movable toward and away from the plates 46 and 50 under the control of the micrometer head 60. Mounted on the track 64 is a slide assembly including an L-shaped body 70 fitted with fixed longitudinal spacers 72 which are slidable in the slots 66. The slide body 70 is closed at its end by a cap 74 and on its side by a cover 76, both affixed to the body by screws 78 as seen in FIG. 2. The micrometer 58 includes a nut 80 secured in the cap 74 and a threaded spindle 82 longitudinally adjustable by turning in the nut and positioned to abut the inner end of the finger 68 to limit the inward travel of the body 70 on the track 64. The body 70 is urged inwardly by tension springs 84 mounted in the slots 66 and stretched between the bottoms of the slots and the bottoms of drilled holes in the inner ends of the spacers 72.

Figure 4:
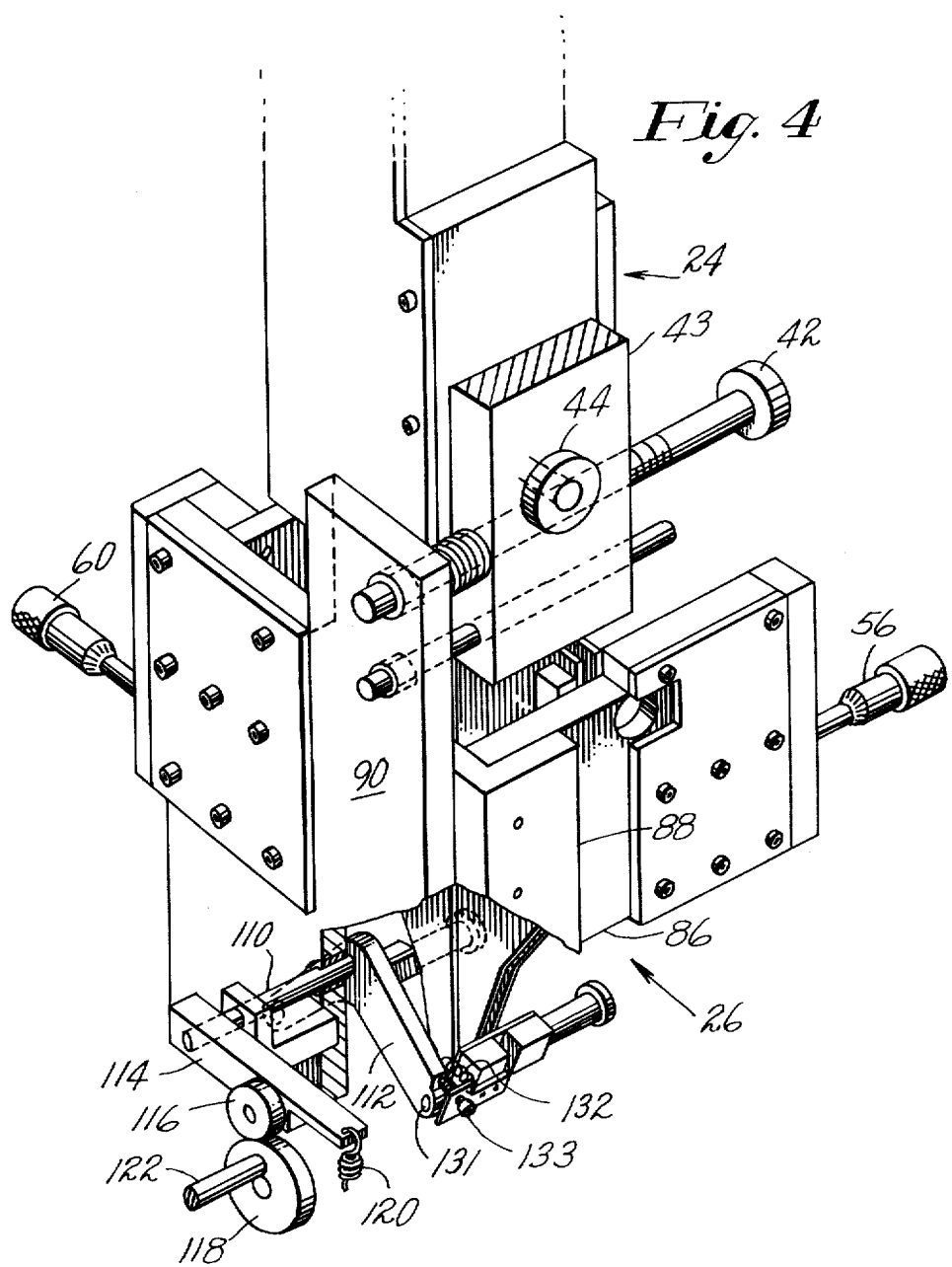
FIG. 4 is a view as seen from above and rear showing details of a drive for the escapement depicted in FIG. 3.

Basically the same mechanism as already described in associated with the micrometer head 56 for controlling the in and out adjustment of the plate 50 except that the trifurcated track corresponding to the track 64 is formed in a stationary member 86, best seen in FIG. 4 which is fixed to a vertical angle iron 88 in turn secured to an upright plate 90 upstanding from the base plate 30. In the mechanism associated with the micrometer head 60 for controlling the lateral adjustment of the plates 48 and 52, the trifurcated track is formed in the vertical plate 90 and operates in essentially the same manner as that described with reference to the micrometer head 58 except that only a relatively small amount of adjustment is needed as compared to that necessary in the heads 56 and 58.

Figure 6:
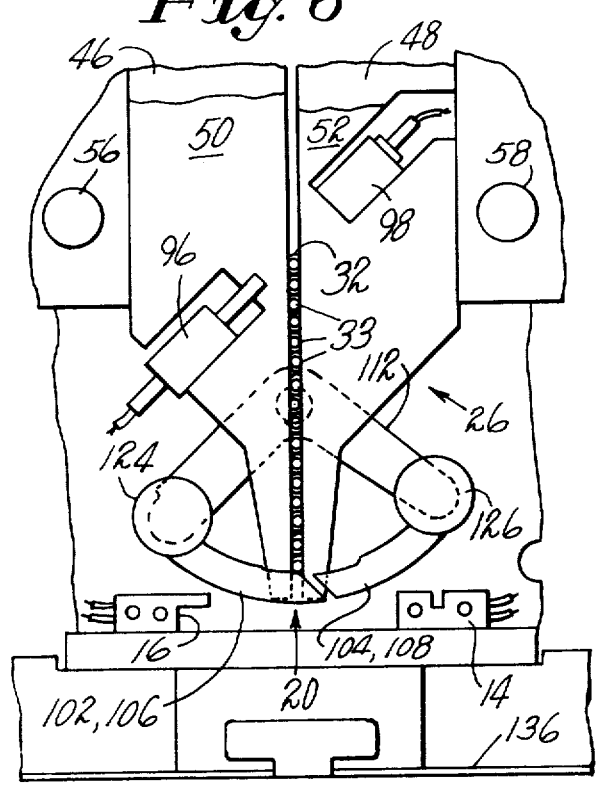
FIGS. 6 and 7 are similar fragmentary views in front elevation showing the lower portion of the vertical guideway to illustrate the operation of the escapement, in retaining position in FIG. 6 and in discharging position in FIG. 7.

Workpieces are supplied to the cascade assembly 24 from the bowl feeder 10 when a motor 94 which drives the feeder is energized. From the feeder, the workpieces proceed down the ramp 22, fall through the cascade assembly 24 and enter the vertical guideway assembly 26. As best shown in FIG. 6, there is provided a photoelectric device including a light source 96 and a photocell 98 for controlling the replenishment of the vertical guideway assembly 26. The photocell 98 is connected in a simple circuit (not shown) to energize a power relay having normally open contacts in series with the motor 94 to supply power to the motor whenever the top of the stack of workpieces in the vertical guideway assembly reaches the level shown in FIG. 6, which allows the photocell 98 to be illuminated by light from the source 96. Whenever the top of the stack of workpieces falls below the line between the light source and the photocell, the motor 94 is energized and remains in operation for an adjustable period of time sufficient to allow the guideway assembly 26 to be substantially filled with workpieces of a given size. During the remainder of the time when the feeding of workpieces is not required, the feeder remains inoperative.

The escapement assembly, as best seen in FIGS. 3 and 4, comprises left and right rear fingers 102 and 104 respectively which cooperate with left and right front fingers 106 and 108 respectively. The fingers 102, 104, 106 and 108 are arcuate in form, being shaped with an inside radius equal to the distance from a shaft 110 upon which they are pivotally mounted at the ends of a two armed lever 112. A swinging motion is imparted to the lever 112 through a cam arrangement including a follower arm 114 upon which is mounted a follower roll 116, maintained in contact with an eccentric cam 118 by a tension spring 120. The cam 118 is fixed to a shaft 122 which is driven by an electric motor under the control of the counter 12. Thus when the present apparatus is being operated in a batching mode for dispensing a pre-determined number of workpieces into a container, the counter 12 is set to the number and shuts off the motor driving the cam 118 when the present quantity has been reached. When, however, the counter 12 is being operated in a counting mode, the motor driving the shaft 122, continues to impart an oscillating motion to the lever 112 until the machine is shut off.

As has been previously indicated, the counting process is accomplished independently of the motion imparted to the fingers 102, 104, 106 and 108 and provision is also included in the present apparatus, as will now be seen, to prevent more than one article from being dispensed during each oscillation of the fingers. Before proceeding, however with the description of the manner in which the workpieces are controlled by the fingers 102, 104, 106 and 108, the means included in the present apparatus for adapting the escapement 20 to handle workpieces having different lengths of bodies 32 and different diameters of lead wires 33 will now be described. The rear fingers 102 and 104 are mounted on the lever 112 with a minimum clearance between their front surfaces and the back surfaces of the plates 46 and 48. Neither of the fingers 102 and 104 is provided with an adjustment in the front to rear direction. The finger 104 is fixedly mounted on the right arm of the lever 112 but the finger 102 is adjustable with the finger 106 toward and away from the finger 104. As best seen in FIG. 3, the fingers 106 and 108 are adjustable into close proximity with the front surfaces of the plates 50 and 52 by means of adjusting screws 124 and 128 respectively. The screw 124 controls the movement of a slide 128 on which the finger 106 is mounted and similarly the screw 126 controls the adjustment of a slide 130 upon which the finger 108 is mounted.

In setting the present apparatus to count leaded components of a particular size, the distance between the back plates 46 and 48 and the front plates 50 and 52 is adjusted to suit the length of the body 33 by setting the micrometer heads 56 and 58 to the same setting. The micrometer head 60 is then adjusted to suit the diameter of the lead wires 33. The adjusting screws 124 and 126 are next advanced to bring the fingers 128 and 130 to a position in which they just miss contacting the fronts of the plates 50 and 52. As best seen in FIG. 4, the slide 128 is mounted on a pivot 131 and urged in a counter-clockwise direction by a tension spring 132 under the control of an adjusting screw 133. The spacing between the ends of the fingers 102 and 106 on the one hand and the fingers 104 and 108 on the other is determined by the setting of the screw 133 to accommodate the diameter of the lead wires 33 in the escapement assembly 20.

Figure 7:
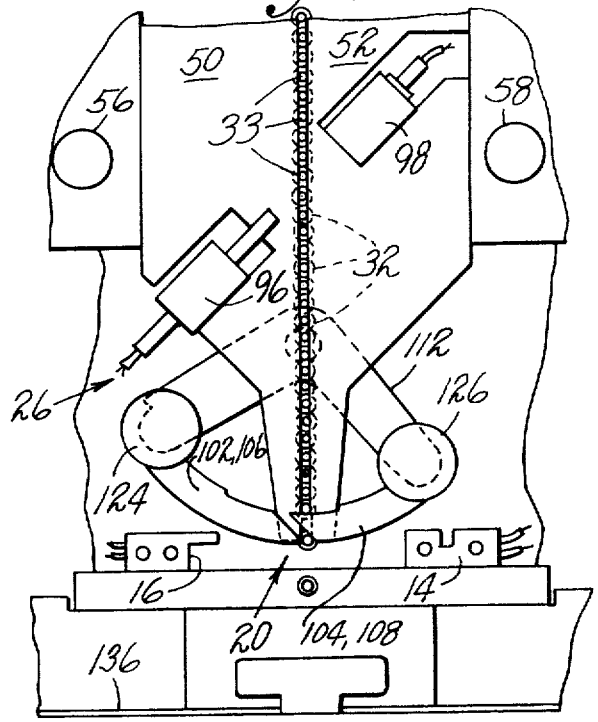

The operation of the escapement assembly 20 is best seen in FIGS. 6 and 7 in which the escapement is depicted in holding and releasing condition respectively. As seen in FIG. 6, the tops of the fingers 102 and 106 provide a rest for the lead wires 33, holding the lowermost workpiece 32, 33 and the workpieces above it in the vertical guideway assembly 26 against discharge through the escapement assembly 20. As the lever 112 moves in a clockwise direction from the position of FIG. 6 to that of FIG. 7, the lowermost workpiece 32, 33 descends with its lead wires 33 between the ends of the fingers 102, 106 on the left and the fingers 104, 108 on the right to escape from the vertical guideway assembly 26 and at the same time, the upper surfaces of the front and back right fingers 104 and 108 support the next lowermost workpiece by its lead wires 33 to prevent its escape from the guideway assembly 26. Passage of the workpiece 32, 33 between the light source 16 and the photo cell 14 causes an electrical pulse to be sent by the photo cell 14 to the counter 12 to register one unit. The pulse to the counter 12 is independent of the motion of the fingers 102, 104, 106 and 108 and of the lever 112 and depends entirely upon the partial obscuring of light from the source 16 to the photo cell 14. As has been previously indicated, the counter 12 with its batch counting and lot counting capabilities is a commercially available unit. In a typical operation, quantities of workpieces 32, 33 either in a batch or being counted from a lot, are dispensed from the escapement assembly 20 into a box 134 appropriately positioned on a special shelf 136 provided for this purpose.

Having thus disclosed my invention, what I claim as new and desire to secure by Letters Patent of the United States is:

1. Apparatus for dispensing axially leaded workpieces one at a time and for counting the workpieces as they are being dispensed, comprising a vertical guideway for storing a quantity of uniformly oriented workpieces to be dispensed, means for adjusting the vertical guideway to adapt to different lengths of workpiece bodies and for independently adjusting for different lead wire diameters, both within predetermined ranges, means for feeding workpieces to the guideway, means for dispensing workpieces one at a time for free fall from the lower end of the guideway, and means below and independent of the dispensing means for counting the workpieces being dispensed while in free fall.

2. Apparatus according to claim 1 further characterized in that the counting means comprises a photo cell and a light source both mounted below the dispensing means, the light source directing a beam of light upon the cell across the path of workpieces being dispensed from the lower end of the guideway after the workpieces have dropped from the dispensing means.

3. Apparatus according to claim 1 further characterized in that the vertical guideway comprises a pair of front and a pair of rear vertical plates defining the guideway beween adjacent edges of the two pairs, and the adjusting means includes a slide mounting for each of the front plates for varying their distance from each of the rear plates.

4. Apparatus according to claim 1 further characterized in that the vertical guideway comprises a pair of front and a pair of rear vertical plates defining the guideway between adjacent edges of the two pairs, and the adjusting means includes a common slide upon which the front plates are mounted for adjusting the distance between the edges of the plates of each pair.

5. Apparatus according to claim 4 further characterized in that the adjusting means further comprises a slide mounting for each of the front plates for varying their distance from each of the rear plates.

6. Apparatus according to claim 1 further characterized in that the dispensing means comprises an adjustable escapement in alignment at the lower end of the guideway and means for imparting an oscillating motion to the escapement to release one workpiece during each oscillating cycle.

7. Apparatus according to claim 6 further characterized in that the escapement comprises two pairs of arcuate fingers and means for adjusting the lateral spacing of the fingers of the two pairs to accommodate workpieces having different body lengths.

8. Apparatus according to claim 6 further characterized in that the escapement comprises two pairs of arcuate fingers and means for adjusting the spacing between adjacent ends of the fingers of each pair to receive lead wires of different diameters.

9. Apparatus according to claim 8 further characterized in that the escapement further comprises means for adjusting the lateral spacing of the fingers of the two pairs.

10. Apparatus for dispensing axially leaded workpieces one at a time, comprising a vertical guideway for storing a quantity of uniformly oriented workpieces to be dispensed, the guideway including two pairs of vertical plates defining the guideway between adjacent edges, the plates having outwardly flared upper edges inclined downwardly toward the adjacent edges to facilitate entry of the workpieces into the guideway, means for adjusting the spacing of the adjacent edges of the plates of each pair and for adjusting the spacing of the pairs of plates from each other, escapement means for dispensing workpieces one at a time from the lower end of the guideway and means below and independent of the dispensing means for counting workpieces in free fall after they have left the dispensing means.

11. Apparatus according to claim 10 further comprising a cascade assembly for orienting workpieces in a generally horizontal direction for entry into the guideway.

* * * * *